(12) United States Patent
Lee et al.

(10) Patent No.: US 10,576,790 B2
(45) Date of Patent: Mar. 3, 2020

(54) PNEUMATIC TIRE

(71) Applicant: KUMHO TIRE CO., INC., Gwangju (KR)

(72) Inventors: Jong Seo Lee, Yongin-si (KR); Hyung-Ju Seo, Hwaseong-si (KR)

(73) Assignee: Kumho Tire Co., Inc., Gwangju (KR)

( * ) Notice: Subject to any disclaimer, the term of this patent is extended or adjusted under 35 U.S.C. 154(b) by 293 days.

(21) Appl. No.: 15/387,775

(22) Filed: Dec. 22, 2016

(65) Prior Publication Data

US 2017/0182851 A1    Jun. 29, 2017

(30) Foreign Application Priority Data

Dec. 29, 2015    (KR) .................. 10-2015-0188571

(51) Int. Cl.
*B60C 11/12*    (2006.01)
*B60C 11/03*    (2006.01)
*B29D 30/06*    (2006.01)

(52) U.S. Cl.
CPC ...... *B60C 11/1218* (2013.01); *B60C 11/0323* (2013.01); *B60C 11/1259* (2013.01); *B60C 11/1272* (2013.01); *B60C 11/1281* (2013.01); *B29D 2030/0613* (2013.01)

(58) Field of Classification Search
CPC . B60C 11/12; B60C 11/1218; B60C 11/1272; B60C 11/1259; B60C 11/1281; B60C 11/0323; B60C 11/1204; B29D 30/0606; B29D 2030/0613
USPC .................................................. 152/209.18
See application file for complete search history.

(56) References Cited

U.S. PATENT DOCUMENTS

| 2005/0109438 A1* | 5/2005 | Collette ............. B29D 30/0606 |
| | | 152/209.18 |
| 2007/0095447 A1* | 5/2007 | Nguyen ................. B60C 11/12 |
| | | 152/209.18 |
| 2009/0159167 A1* | 6/2009 | Scheuren ........... B29D 30/0606 |
| | | 152/209.18 |

FOREIGN PATENT DOCUMENTS

| EP | 1533141 A1 | 5/2005 |
| EP | 1782970 A1 | 5/2007 |
| EP | 2865545 A1 | 4/2015 |
| JP | 2001-1722 A | 1/2001 |
| JP | 2006193088 A | 7/2006 |

(Continued)

*Primary Examiner* — Eric Hug
(74) *Attorney, Agent, or Firm* — BakerHostetler

(57) ABSTRACT

The present invention provides a pneumatic tire including a tread block 10 having a sipe 100 formed therein. A three-dimensional inclined surface groove 110 is formed at an upper portion of the sipe 100 formed in the tread block 10, such that three-dimensional inclined surface protrusions 16 and inclined surface grooves 17 respectively formed on both sipe side wall surfaces 15 forming the sipe 100 so as to correspond to each other may minimize a movement of the tread blocks 10 due to a stress generated from the tire contacting with a ground during driving, so as to increase a traction force. In addition, a lower through groove is formed at a lower portion of the sipe 100 formed in the tread block 10, such that it is possible to reduce a resonance noise of the tire occurring when driving, more easily and automatically discharge the foreign matters caught in the sipes 100 of the tire during driving, and improve a traction performance of the tire in the latter half of the tire lifespan by dividing the remaining tread block 10 after the upper portion of the tread block 10 is worn.

11 Claims, 6 Drawing Sheets

(56) References Cited

FOREIGN PATENT DOCUMENTS

| | | | | |
|---|---|---|---|---|
| JP | 4441949 | B2 | 3/2010 | |
| JP | 5231349 | B2 | 7/2013 | |
| KR | 10-1037410 | * | 5/2011 | ......... B60C 11/1218 |
| KR | 10-1289574 | B1 | 7/2013 | |
| KR | 10-1467465 | B1 | 12/2014 | |
| KR | 10-1467471 | B1 | 12/2014 | |
| KR | 10-1580888 | B1 | 12/2015 | |

* cited by examiner

PNEUMATIC TIRE

CROSS REFERENCE TO RELATED APPLICATIONS

This application claims priority to Korean Patent Application No. 10-2015-0188571, filed on Dec. 29, 2015 in the Korean Intellectual Property Office, the entire disclosure of which is incorporated herein by reference.

BACKGROUND OF THE INVENTION

Field of the Invention

The present invention relates to a pneumatic tire, and more particularly, to a pneumatic tire having sipes which may minimize a movement of a tire tread block due to a stress generated during contacting with a ground, improve soil drainage, and increase a traction force in the latter half of use.

Description of the Related Art

As is generally known, a tread surface of a tire of an automobile, which contacts with a ground, includes grooves formed therein, and tread blocks which are defined by the grooves and formed thereon while having a constant tread pattern.

In order to improve a traction force and a braking force, the sipes are formed in the tread block. The sipe serves to appropriately adjust a stiffness of the tread block so as to satisfy a performance required for the tire.

In particular, the sipe applied to a pneumatic tire for a heavy load used in a truck or a bus is formed in a shape that can effectively prevent a stress concentration in accordance with the high load.

The sipes applied to the conventional tread block are formed in a vertical direction with respect to the tread, such that it is possible to disperse a stress only in a traverse direction with respect to a driving direction. However, when applying the sipes to the tread block for dispersing the stress, an entire stiffness of the tread block is decreased, thereby causing a problem such as abnormal abrasion.

In addition, as a cross-sectional shape of the sipe is complicated, the stiffness of the tread block is increased, but it is difficult to manufacture the tire. Further, the sipe has a structure that, when soil enters into the sipe, it is difficult to discharge the soil, thus the introduced soil is accumulated in the sipe, and the sipe is clogged. When becoming the tire in the latter half of use, a depth of the sipe of the tread block is decreased, such that there is a problem of reducing the traction force.

PRIOR ART DOCUMENT

Patent Document

[Patent Document 1] Korean Patent Registration No. 10-1467471 (registered on Nov. 25, 2014)
[Patent Document 2] Korean Patent Registration No. 10-1467465 (registered on Nov. 25, 2014)

SUMMARY OF THE INVENTION

In consideration of the above-described problems, it is an object of the present invention to provide a pneumatic tire which may minimize a movement of a tire tread block due to a stress generated during contacting with a ground, by changing a shape of a sipe formed in the tread block to increase a traction force, and in particular, may allow for easy manufacture of a tire, improve soil drainage, and increase the traction force in the latter half of a tire lifespan.

In order to accomplish the above objects, there is provided a pneumatic tire which includes tread blocks having sipes formed therein, wherein the sipe includes: a three-dimensional inclined surface groove in which three-dimensional inclined surface protrusions and inclined surface grooves are respectively formed on both sipe side wall surfaces facing each other of the tread block so as to correspond to each other; and a lower through groove which is formed by penetrating at a lower portion of the three-dimensional inclined surface groove in a width direction of the tread block so as to communicate therewith.

Preferably, an entire height SH of the sipe to a height BH of the tread block is formed within a range of $0.3 \leq SH/BH \leq 0.95$, a height H of the three-dimensional inclined surface groove to the height BH of the tread block is formed within a range of $0.3 \leq H/BH \leq 0.6$, and a height GH of the lower through groove to the height BH of the tread block is formed within a range of $0.3 \leq GH/BH \leq 0.7$.

In addition, preferably, a width G of the three-dimensional inclined surface groove in a thickness direction thereof is formed within a range of $0.4 \text{ mm} \leq G \leq 1.2 \text{ mm}$.

Further, preferably, the lower through groove is configured so that a transverse-sectional shape in the thickness direction of the tread block is formed in a polygonal shape including a triangle, rectangle, pentagon, hexagon, octagon, circle and oval.

Further, preferably, a width K of the lower through groove in a thickness direction thereof is formed within a range of $4 \text{ mm} \leq K \leq 10 \text{ mm}$.

Further, preferably, the both sipe side wall surfaces of the tread block forming the three-dimensional inclined surface groove includes: an upper refracted surface part formed by bending in a zigzag form while forming a band shape at a preset cycle in the width direction at an upper side of the tread block; and a three-dimensional inclined surface part continuously formed at a preset cycle in the width direction and a height direction of the tread block so that the inclined surface protrusions and the inclined surface grooves are continuously alternated between the upper refracted surface part and the lower through groove.

Further, preferably, the three-dimensional inclined surface part includes: a first uneven cycle section continuously formed at the lower side of the upper refracted surface part so that the inclined surface protrusions and the inclined surface grooves are continuously alternately formed at a first preset cycle in the width direction of the tread block; a second uneven cycle section continuously formed at the upper side of the lower through groove so that the inclined surface protrusions and the inclined surface grooves are alternately formed at a second preset cycle in the width direction of the tread block; and a third uneven cycle section is continuously formed between the first uneven cycle section and the second uneven cycle section so that the inclined surface protrusions and the inclined surface grooves are alternately formed at the first preset cycle in the width direction of the tread block.

Further, preferably, the first uneven cycle section and the second uneven cycle section are configured so that the inclined surface protrusions and the inclined surface grooves are alternately formed at the same cycle as each other; and the second uneven cycle section is configured so that the inclined surface protrusions and the inclined surface grooves are alternately formed at a retardation of a ½ pitch with the first uneven cycle section.

Further, preferably, the three-dimensional inclined surface part comprises: a first uneven cycle section continuously formed at the lower side of the upper refracted surface part so that the inclined surface protrusions and the inclined surface grooves are continuously alternately formed at a first preset cycle in the width direction of the tread block; a second uneven cycle section continuously formed at the upper side of the lower through groove so that the inclined surface protrusions and the inclined surface grooves are alternately formed at the first preset cycle in the width direction of the tread block; and a third uneven cycle section is continuously formed between the first uneven cycle section and the second uneven cycle section so that the inclined surface protrusions and the inclined surface grooves are alternately formed at a second preset cycle in the width direction of the tread block.

Further, preferably, the third uneven cycle section is configured so that the inclined surface protrusions and the inclined surface grooves are alternately formed at a retardation of a ½ pitch with the first uneven cycle section in the width direction of the tread block.

Further, preferably, the inclined surface protrusions and the inclined surface grooves are formed in a quadrangular pyramid form.

Further, preferably, a height PH of the inclined surface protrusion is formed within a range of $0.65\ mm \leq PH \leq 1.45\ mm$.

Furthermore, preferably, the inclined surface protrusions of the first uneven cycle section and the second uneven cycle section include discharge grooves formed on both inclined surfaces thereof in the width direction of the tread block along the thickness direction of the tread block.

Furthermore, preferably, a radius of curvature SGR of the discharge groove is formed within a range of $0.1\ mm \leq SGR \leq 0.4\ mm$.

According to the pneumatic tire of the present invention, the three-dimensional inclined surface groove is formed at the upper portion of the sipe formed in the tread block, such that the three-dimensional inclined surface protrusions and the inclined surface grooves respectively formed on both sipe side wall surfaces forming the sipe so as to correspond to each other may minimize the movement of the tread blocks due to the stress generated from the tire contacting with the ground during driving, thus to increase a traction force.

In addition, according to the pneumatic tire of the present invention, the lower through groove is formed at the lower portion of the sipe formed in the tread block, such that it is possible to reduce a resonance noise of the tire occurring when driving, more easily and automatically discharge the foreign matters caught in the sipes of the tire during driving, and improve the traction performance of the tire in the latter half of the tire lifespan by dividing the remaining tread block after the upper portion of the tread block is worn.

Further, according to the pneumatic tire of the present invention, the discharge grooves are formed on both inclined surfaces in the width direction of the tread block of the inclined surface protrusion formed on the both sipe side wall surfaces of the tread block forming the three-dimensional inclined surface groove of the sipe along the thickness direction of the tread block, such that it is possible to more effectively prevent the foreign matters from being caught in the sipe together with the above-described lower through groove.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
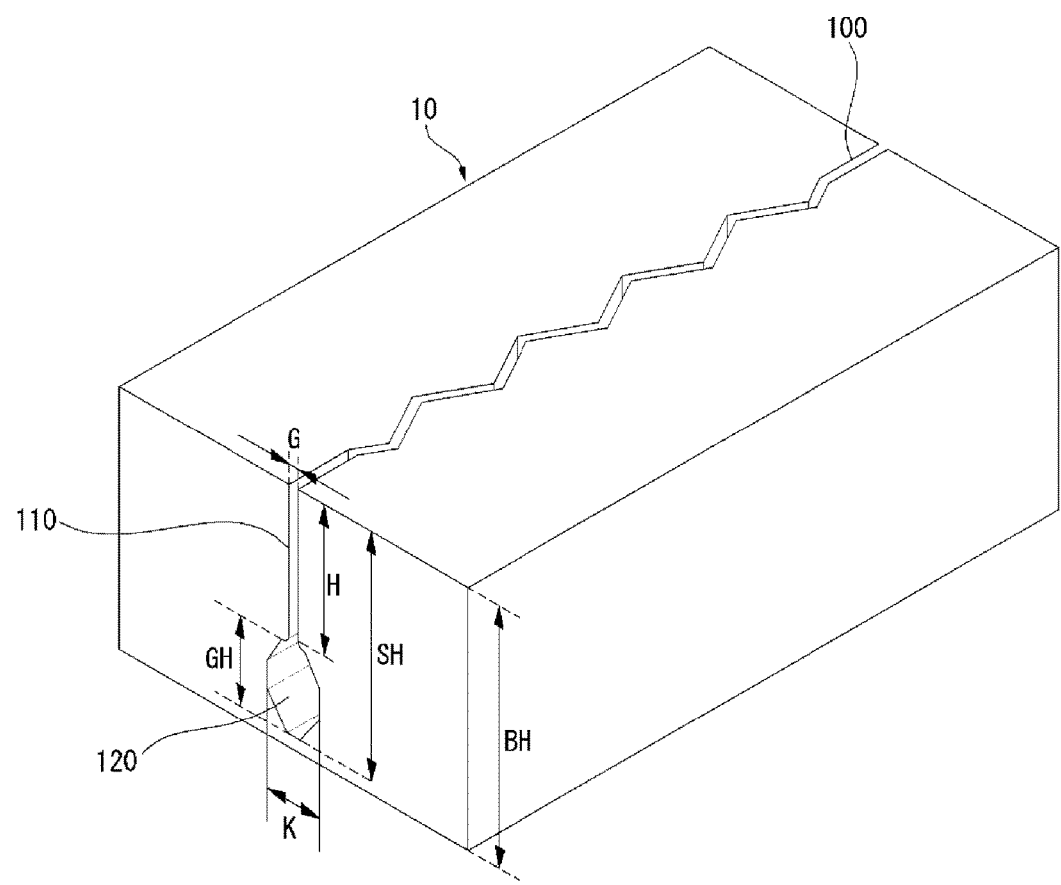
FIG. 1 is a perspective view illustrating a tread block applied to a pneumatic tire according to an embodiment of the present invention.

Hereinafter, preferred embodiments of the present invention will be described in detail with reference to the accompanying drawings, so as to assist those having ordinary skill in the art in a comprehensive understanding of the invention, and the present invention is not limited to the embodiments disclosed below. In the embodiments of the present invention, publicly known functions and configurations that are judged to be able to make the purport of the present invention unnecessarily obscure will not be described. Referring to the drawings, wherein like reference characters designate like or corresponding parts throughout the several views.

Figure 2:
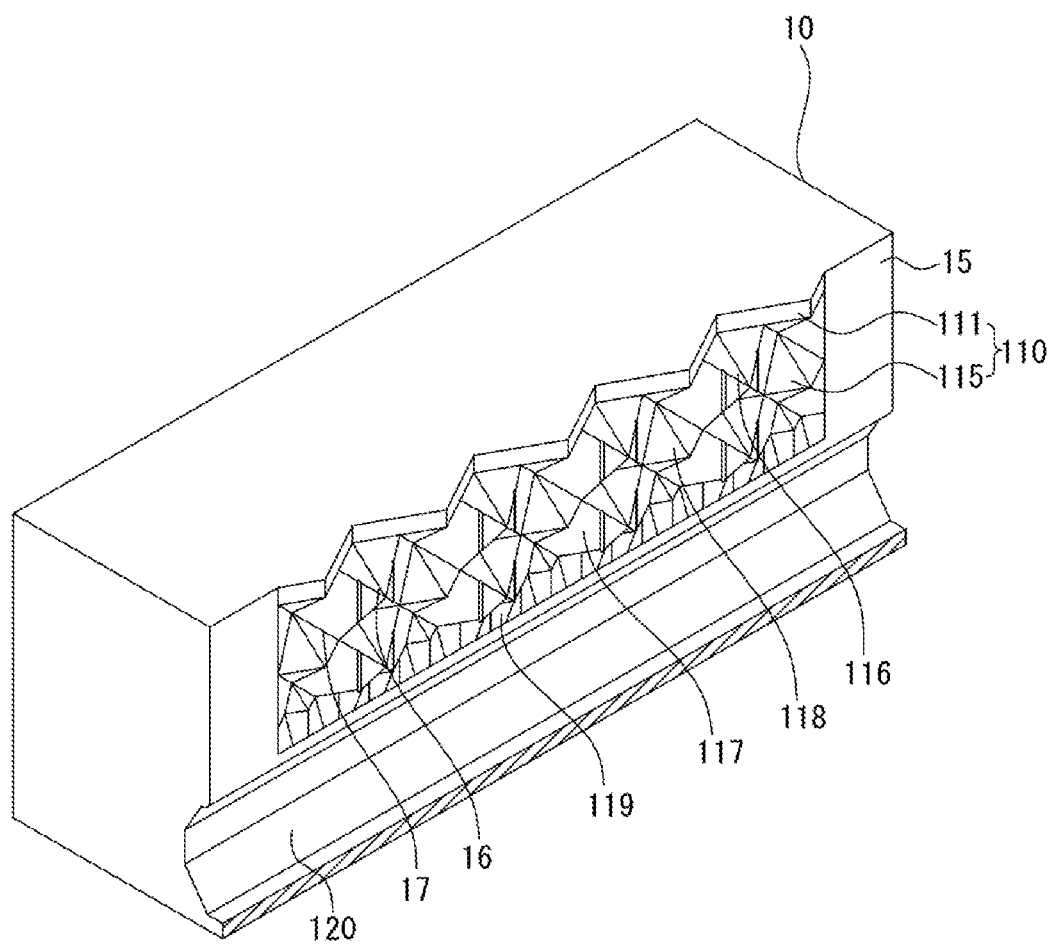
FIG. 2 is a partially cutaway view of the tread block taken on a sipe of FIG. 1.
Figure 3:
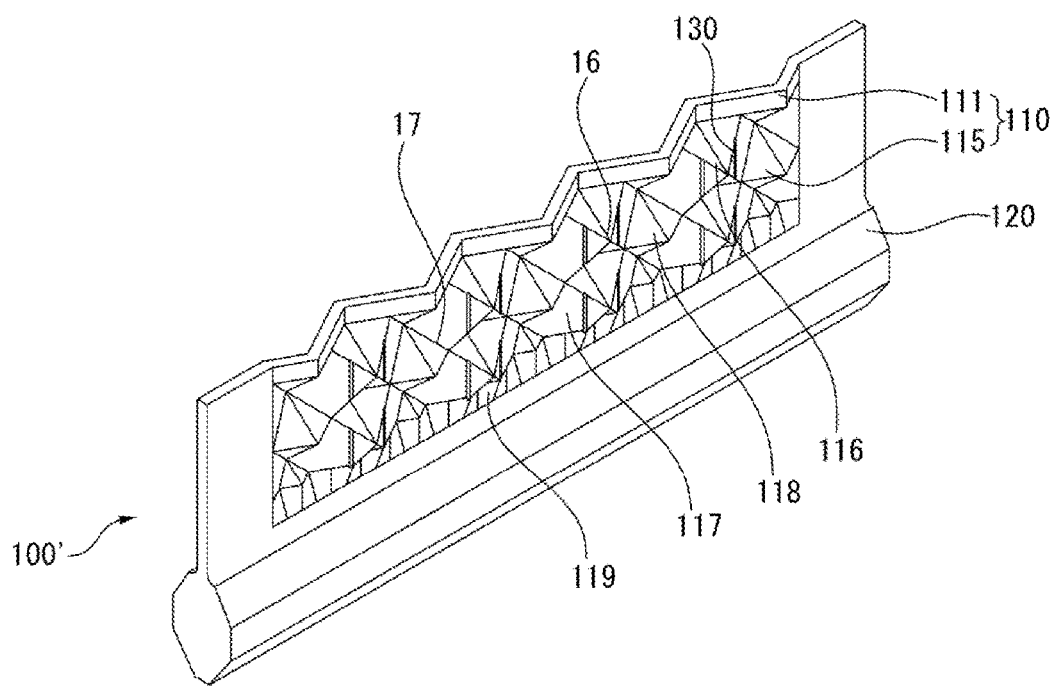
FIG. 3 is a perspective view illustrating a sipe blade of FIG. 2.

FIG. 1 is a perspective view illustrating a tread block applied to a pneumatic tire according to an embodiment of the present invention, FIG. 2 is a partially cutaway view of the tread block taken on a sipe of FIG. 1, and FIG. 3 is a perspective view illustrating a sipe blade of FIG. 2.

Referring to FIGS. 1 and 2, the pneumatic tire according to the embodiment of the present invention includes: a plurality of tread blocks 10 which are defined by longitudinal grooves formed in a circumferential direction of the tire in a tread rubber layer contacting with a ground, and transverse grooves formed in a width direction of the tire; and one or more sipes 100 formed in the tread blocks 10 as necessary.

The sipes 100 serve to appropriately control a stiffness of the tread blocks 10 through a combination of an internal shape and the number of the sipes formed therein thus to increase the traction force and a braking force of the tire, and so as to satisfy a required performance according to usage conditions of the tire.

Meanwhile, the shape of the sipe 100 formed in the tread block 10 is shaped through a sipe blade 100' (see FIG. 3) installed in a tire vulcanizing mold.

Accordingly, the shape of the sipe side wall surfaces 15 divided in the sipe 100 within the tread block 10 has the same shape as the shape of the both side wall surfaces of the sipe blade 100'. Therefore, in order to provide better understanding of the shape of the sipe side wall surface 15 of the sipe 100 and the tread block 10 to be described below, hereinafter, the sipe structure will be described using the sipe blade 100'.

Meanwhile, the pneumatic tire according to the present embodiment illustrates a pneumatic tire for a heavy load mainly used in a truck or a bus. The sipe 100 formed in the tread block 10 of the pneumatic tire for a heavy load is formed so as to have a three-dimensional inclined surface groove 110 and a lower through groove 120 which are formed in a depth direction from an upper surface of the tread block 10.

Herein, the three-dimensional inclined surface groove 110 is a portion in which three-dimensional inclined surface protrusions 16 and the inclined surface grooves 17 are respectively formed on both sipe side wall surfaces 15 facing each other of the tread block 10 so as to correspond to each other, so that the inclined surface protrusions 16 and the inclined surface grooves 17 corresponding to each other minimize a movement of the tread blocks 10 due to the stress generated from the tire contacting with the ground during driving, thus to increase the traction force.

In addition, the lower through groove 120 is a portion which is formed by penetrating at a lower portion of the sipe 100 in a polygonal transverse-sectional shape in the width direction of the tread block 10 so as to communicate therewith, such that it is possible to reduce a resonance noise of the tire occurring when driving, more easily and automatically discharge foreign matters caught in the sipes of the tire during driving, and improve a traction performance of the tire in the latter half of a tire lifespan by dividing the tread block 10 after the upper portion of the tread block is worn.

The present embodiment illustrates the lower through groove 120 formed in a hexagonal shape having a major axis in a height direction of the tread block 10. However, the present invention is not particularly limited thereto, and of course, the transverse-sectional shape in the width direction of the tread block 10 may be deformed in various polygonal shapes including a triangle, rectangle, pentagon, hexagon, octagon, circle and oval to be applied to the tire, so long as they achieve the above-described advantages according to the formation of the above-described lower through groove 120.

Meanwhile, it is preferable that an entire height SH of the sipe 100 to a height BH of the tread block 10 is formed within a range of $0.3 \leq SH/BH \leq 0.95$, a height H of the three-dimensional inclined surface groove 110 to the height BH of the tread block 10 is formed within a range of $0.3 \leq H/BH \leq 0.6$, and a height GH of the lower through groove 120 to the height BH of the tread block 10 is formed within a range of $0.3 \leq GH/BH \leq 0.7$.

That is, if the entire height SH of the sipe 100 to the height BH of the tread block is less than 0.3, it is difficult to expect an effect capable of increasing the traction force of the tire by defining the tread block 10 through the lower through grooves 120 in the latter half of abrasion, and if the entire height thereof exceeds 0.95, there is a disadvantage of affecting a thickness of the tread rubber layer from a groove bottom surface to the uppermost belt surface to cause a decrease in durability of the tire.

In addition, if the height H of the three-dimensional inclined surface groove 110 to the height BH of the tread block 10 is less than 0.3, flexibility of the tread block 10 is decreased, and if the height thereof exceeds 0.6, the stiffness of the tread block 10 is decreased.

Further, if the height GH of the lower through groove 120 to the height BH of the tread block 10 is less than 0.3, it is difficult to discharge the foreign matters caught in the sipe 100 such as sand or small stones therethrough, and if the height exceeds 0.7, there is a disadvantage of affecting a thickness of the tread rubber layer from a groove bottom surface to the uppermost belt surface to cause a decrease in durability of the tire.

Meanwhile, it is preferable that a width G of the three-dimensional inclined surface groove 110 in the width direction thereof is formed within a range of $0.4 \text{ mm} \leq G \leq 1.2 \text{ mm}$.

Herein, if the width G of the three-dimensional inclined surface groove 110 in the width direction is less than 0.4 mm, a problem entailed in manufacturing that the shape of the sipe 100 is not maintained to be collapsed during vulcanizing occurs, and if the width thereof exceeds 1.2 mm, there is a disadvantage that large foreign matters such as stones are caught inside the sipe 100 to easily damage the internal shape of the upper three-dimensional inclined surface groove 110.

In addition, it is preferable that a width K of the lower through groove 120 in a thickness direction thereof is formed within a range of $4 \text{ mm} \leq K \leq 10 \text{ mm}$.

If the width K of the lower through groove 120 in the thickness direction is less than 4 mm, it is impossible to improve traction ability and traction efficiency by dividing the tread block 10 into two blocks therethrough in the latter half of abrasion of the tread block 10.

Figure 4:
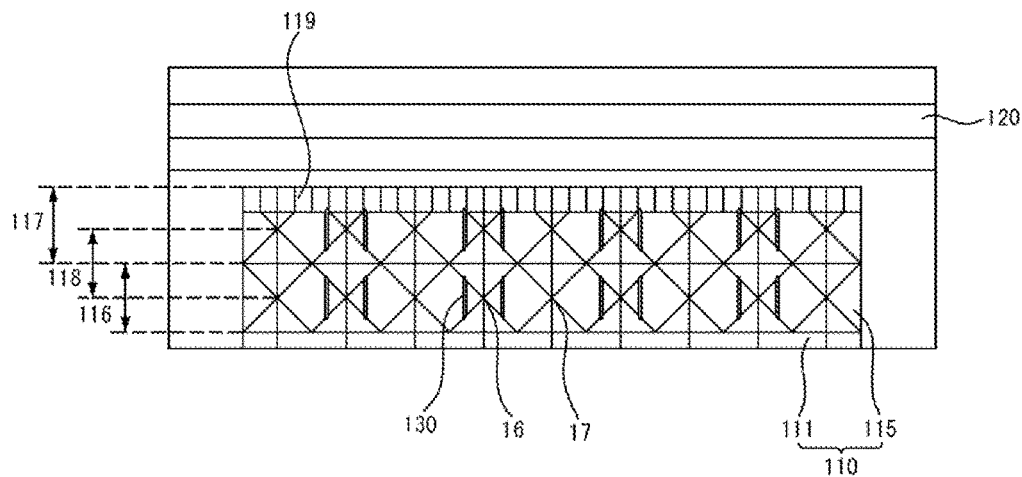
FIGS. 4 and 5 are side views of the sipe blade of FIG. 3.
Figure 5:
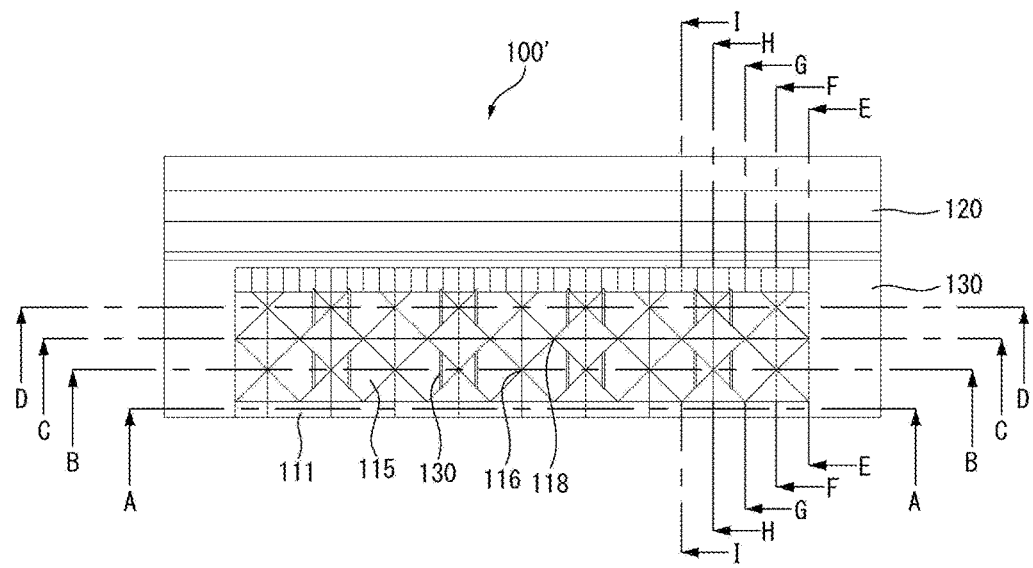
Figure 6:
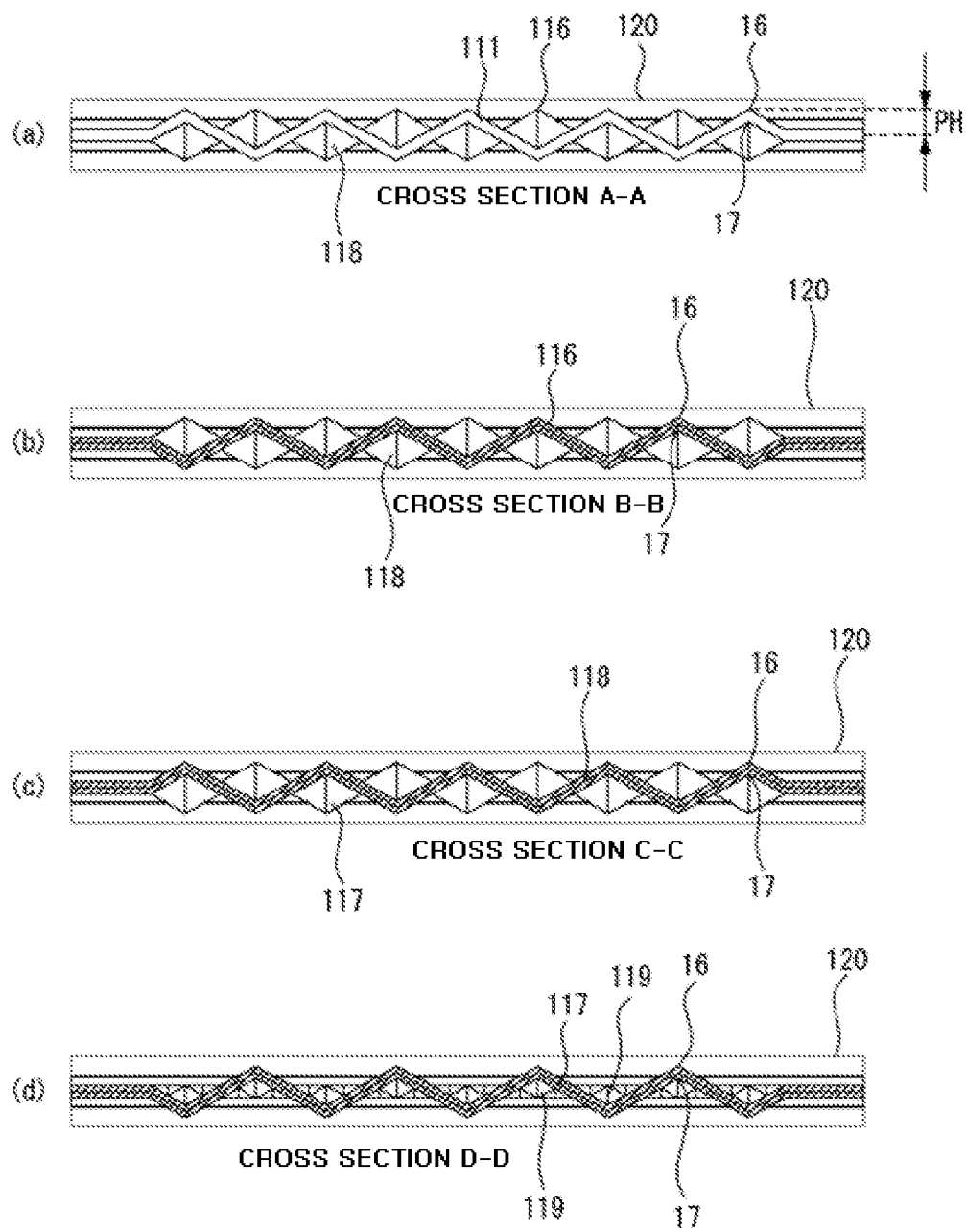
FIG. 6 is a longitudinal sectional view illustrating each part of the sipe blade of FIG. 5.
Figure 7:
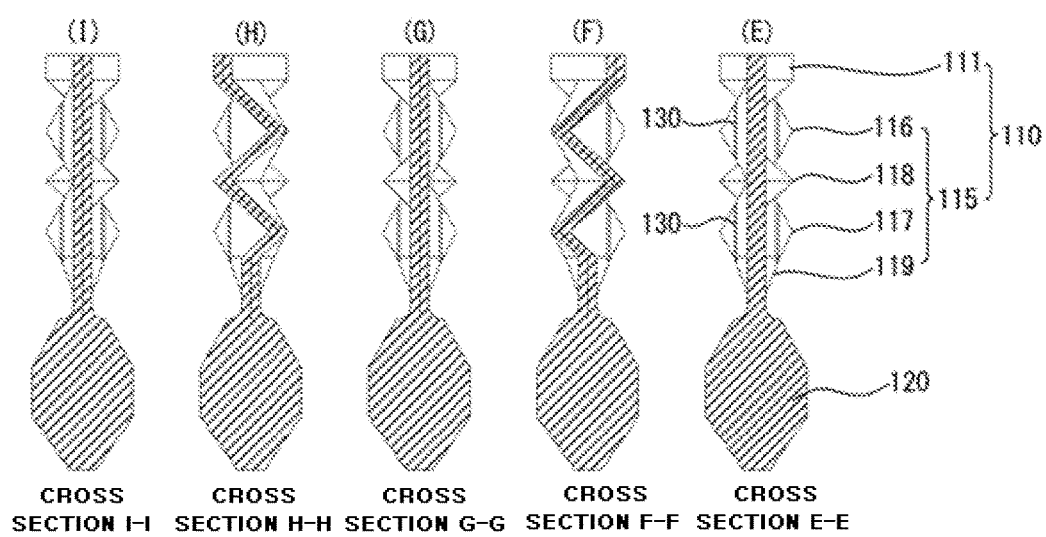
FIG. 7 is a transverse sectional view illustrating each part of the sipe blade of FIG. 5.

FIGS. 4 and 5 are side views of the sipe blade of FIG. 3, FIG. 6 is a longitudinal sectional view illustrating each part of the sipe blade of FIG. 5, and FIG. 7 is a transverse sectional view illustrating each part of the sipe blade of FIG. 5.

Referring to FIGS. 4 to 7, structural characteristics of the three-dimensional inclined surface groove 110 will be described in detail below using the shape of the sipe blade 100'. The both sipe side wall surfaces 15 of the tread block 10 forming the three-dimensional inclined surface groove 110 largely include an upper refracted surface part 111 and a lower three-dimensional inclined surface part 115.

The upper refracted surface part 111 is formed by bending in a zigzag form while forming a band shape at a preset cycle in the width direction at an upper side of the tread block 10. Herein, the upper refracted surface part is formed at the same cycle as that of a third uneven cycle section 118 to be described below.

In addition, the three-dimensional inclined surface part 115 is continuously formed at a preset cycle in the width direction and the height direction of the tread block 10 so that the inclined surface protrusions 16 and the inclined surface grooves 17 are continuously alternated between the upper refracted surface part 111 and the lower through groove 120.

The three-dimensional inclined surface part 115 includes a first uneven cycle section 116, a second uneven cycle section 117, and the third uneven cycle section 118, when subdividing.

The first uneven cycle section 116 is continuously formed at the lower side of the upper refracted surface part 111 so that the inclined surface protrusions 16 and the inclined surface grooves 17 are continuously alternated at a first preset cycle in the width direction of the tread block 10.

The second uneven cycle section 117 is continuously formed at the upper side of the lower through groove 120 so that the inclined surface protrusions 16 and the inclined surface grooves 17 are continuously alternated at a second preset cycle in the width direction of the tread block 10.

In addition, the third uneven cycle section 118 is continuously formed between the first uneven cycle section 116 and the second uneven cycle section 117 so that the inclined surface protrusions 16 and the inclined surface grooves 17 are continuously alternately formed at the first cycle equally to the first uneven cycle section 116 in the width direction of the tread block 10.

The second uneven cycle section 117 is continuously formed at the upper side of the lower through groove 120 so that the inclined surface protrusions 16 and the inclined surface grooves 17 are alternately formed at the first preset cycle in the width direction of the tread block 10.

In addition, the third uneven cycle section 118 is continuously formed between the first uneven cycle section 116 and the second uneven cycle section 117 so that the inclined surface protrusions 16 and the inclined surface grooves 17 are alternately formed at a second preset cycle in the width direction of the tread block 10.

Herein, the third uneven cycle section 118 is configured so that the inclined surface protrusions 16 and the inclined surface grooves 17 are alternately formed at a retardation of a ½ pitch with the first uneven cycle section 116 in the width direction of the tread block.

The present embodiment illustrates a configuration in which the inclined surface protrusions 16 and the inclined surface grooves 17 are formed in a quadrangular pyramid form such as a pyramid.

As such, the inclined surface protrusions 16 and the inclined surface grooves 17 corresponding thereto are formed so as to have two horizontal triangular inclined surfaces and two vertical triangular inclined surfaces. Thereby, due to matching the shape of the inclined surface protrusion 16 with the shape of the inclined surface groove 17 corresponding to each other formed on the both sipe side wall surfaces 15 of the tread block 10, the pneumatic tire of the present invention has effects of more effectively supporting and reinforcing a support stiffness with respect to loads in the width direction, the height direction or a composite direction thereof of the tread block 10.

Meanwhile, it is preferable that a height PH of the inclined surface protrusion 16 is formed within a range of 0.65 mm≤PH≤1.45 mm.

Herein, the height PH of the inclined surface protrusion 16 corresponds to a depth of the inclined surface groove 17, and corresponds to a ½ amplitude of the first to third uneven cycle sections 116, 117 and 118.

Accordingly, if the height PH of the inclined surface protrusion 16 is less than 0.65 mm, an area of the inclined surface protrusion 16 and the inclined surface groove 17 facing and rubbing each other with the sipe 100 interposed therebetween is significantly decreased, such that it is not possible to sufficiently reinforce the support stiffness of the tread block 10. If the height thereof exceeds 1.45 mm, the area of the inclined surface protrusion and the inclined surface groove facing and rubbing each other with the sipe 100 interposed therebetween is significantly increased, such that there is a disadvantage of hindering fluidity of the tread block 10 defined with the sipe interposed therebetween, and thereby resulting in abnormal abrasion such as forming a heel and toe.

In addition, the inclined surface protrusions 16 of the first uneven cycle section 116 and the second uneven cycle section 117 include discharge grooves 130 formed on both inclined surfaces thereof in the width direction of the tread block 10 along the thickness direction of the tread block 10.

Herein, it is preferable that a radius of curvature SGR of the discharge groove 130 is formed within a range of 0.1 mm≤SGR≤0.4 mm, so as to more effectively prevent the foreign matters from being caught in the sipe 100 together with the above-described lower through groove 120.

In this case, if the radius of curvature SGR of the discharge groove 130 is less than 0.1 mm, actions and effects for discharging foreign matters are insignificant, and the discharge groove 130 itself is meaningless. If the radius of curvature thereof exceeds 0.4 mm, there is a disadvantage of damaging the sectional shape of the inclined surface protrusions 16 having the quadrangular pyramid shape.

Accordingly, in the pneumatic tire including the tread block 10 having the sipe 100 formed therein, the three-dimensional inclined surface groove 110 is formed at the upper portion of the sipe 100 formed in the tread block 10, such that the three-dimensional inclined surface protrusions 16 and the inclined surface grooves 17 respectively formed on both sipe side wall surfaces 15 forming the sipe 100 so as to correspond to each other may minimize the movement of the tread blocks 10 due to the stress generated from the tire contacting with the ground during driving, thus to increase the traction force. In addition, the lower through groove 120 is formed at the lower portion of the sipe 100 formed in the tread block 10, such that it is possible to reduce a resonance noise of the tire occurring when driving, more easily and automatically discharge the foreign matters caught in the sipes 100 of the tire during driving, and improve the traction performance of the tire in the latter half of the tire lifespan by dividing the remaining tread block 10 after the upper portion of the tread block 10 is worn. Further, the discharge grooves 130 are formed on both inclined surfaces in the width direction of the tread block 10 of the inclined surface protrusion 16 formed on the both sipe side wall surfaces 15 of the tread block 10 forming the three-dimensional inclined surface groove 110 of the sipe 100 along the thickness direction of the tread block 10, such that it is possible to more effectively prevent the foreign matters from being caught in the sipe 100 together with the above-described lower through groove 120.

While the present invention has been described with reference to the preferred embodiments and modified examples, the present invention is not limited to the above-described specific embodiments and the modified examples, and it will be understood by those skilled in the related art that various modifications and variations may be made therein without departing from the scope of the present invention as defined by the appended claims, as well as these modifications and variations should not be understood separately from the technical spirit and prospect of the present invention.

DESCRIPTION OF REFERENCE NUMERALS

10: tread block,
15: sipe side wall surface
16: inclined surface protrusion,
17: inclined surface groove
100: sipe,
100': sipe blade
110: three-dimensional inclined surface groove,
111: upper refracted surface part
115: three-dimensional inclined surface part,
116: first uneven cycle section
117: second uneven cycle section,
118: third uneven cycle section
119: lower inclined surface part,
120: lower through groove
130: discharge groove,
BH: height of tread block
G: width of three-dimensional inclined surface groove,
GH: height of lower through groove
H: height of three-dimensional inclined surface groove,
K: width of lower through groove
PH: height of inclined surface protrusion,
SH: entire height of sipe SGR: radius of curvature of discharge groove

What is claimed is:

1. A pneumatic tire which includes tread blocks having sipes formed therein,
   wherein the sipe comprises:
   a three-dimensional inclined surface groove in which three-dimensional inclined surface protrusions and inclined surface grooves are respectively formed on both sipe side wall surfaces facing each other of the tread block so as to correspond to each other; and
   a lower through groove which is formed by penetrating at a lower portion of the three-dimensional inclined surface groove in a width direction of the tread block so as to communicate therewith,
   wherein the both sipe side wall surfaces of the tread block forming the three-dimensional inclined surface groove comprise: an upper refracted surface part formed by bending in a zigzag form while forming a band shape at a preset cycle in the width direction at an upper side of the tread block; and a three-dimensional inclined surface part continuously formed at a preset cycle in the width direction and a height direction of the tread block so that the inclined surface protrusions and the inclined surface grooves are continuously alternated between the upper refracted surface part and the lower through groove,
   wherein the three-dimensional inclined surface part comprises: a first uneven cycle section continuously formed at the lower side of the upper refracted surface part so that the inclined surface protrusions and the inclined surface grooves are continuously alternately formed at a first preset cycle in the width direction of the tread block; a second uneven cycle section continuously formed at the upper side of the lower through groove so that the inclined surface protrusions and the inclined surface grooves are alternately formed at the first preset cycle in the width direction of the tread block; and a third uneven cycle section is continuously formed between the first uneven cycle section and the second uneven cycle section so that the inclined surface protrusions and the inclined surface grooves are alternately formed at a second preset cycle in the width direction of the tread block, and
   wherein the inclined surface protrusions of the first uneven cycle section and the second uneven cycle section include discharge grooves formed on both inclined surfaces thereof in the width direction of the tread block along the thickness direction of the tread block.

2. The pneumatic tire according to claim 1, wherein an entire height SH of the sipe to a height BH of the tread block is formed within a range of $0.3 \leq SH/BH \leq 0.95$,
   a height H of the three-dimensional inclined surface groove to the height BH of the tread block is formed within a range of $0.3 \leq H/BH \leq 0.6$, and
   a height GH of the lower through groove to the height BH of the tread block is formed within a range of $0.3 \leq GH/BH \leq 0.7$.

3. The pneumatic tire according to claim 1, wherein a width G of the three-dimensional inclined surface groove in a thickness direction thereof is formed within a range of $0.4 \text{ mm} \leq G \leq 1.2 \text{ mm}$.

4. The pneumatic tire according to claim 1, wherein the lower through groove is configured so that a transverse-sectional shape in the thickness direction of the tread block is formed in a polygonal shape including a triangle, rectangle, pentagon, hexagon, octagon, circle and oval.

5. The pneumatic tire according to claim 1, wherein a width K of the lower through groove in a thickness direction thereof is formed within a range of $4 \text{ mm} \leq K \leq 10 \text{ mm}$.

6. The pneumatic tire according to claim 1, wherein the third uneven cycle section is configured so that the inclined surface protrusions and the inclined surface grooves are alternately formed at
   a retardation of a ½ pitch with the first uneven cycle section in the width direction of the tread block.

7. The pneumatic tire according to claim 6, wherein the inclined surface protrusions and the inclined surface grooves of the first uneven cycle section to the third uneven cycle section are alternately continuously formed at a preset cycle while being overlapped with each other at a ½ pitch in the height direction on both wall surfaces of the tread block.

8. The pneumatic tire according to claim 6, wherein the second uneven cycle section includes a lower inclined surface part formed at the lower side of the tread block in the height direction to smoothly connect the inclined surface protrusions and the inclined surface grooves with the lower through groove, and
   a height of the lower inclined surface part is formed in ½ or less of a vertical pitch of the second uneven cycle section.

9. The pneumatic tire according to claim 7, wherein the inclined surface protrusions and the inclined surface grooves are formed in a quadrangular pyramid form.

10. The pneumatic tire according to claim 9, wherein a height PH of the inclined surface protrusion is formed within a range of $0.65 \text{ mm} \leq PH \leq 1.45 \text{ mm}$.

11. The pneumatic tire according to claim 1, wherein a radius of curvature SGR of the discharge groove is formed within a range of $0.1 \text{ mm} \leq SGR \leq 0.4 \text{ mm}$.

* * * * *